(12) United States Patent
Kim et al.

(10) Patent No.: US 10,464,019 B2
(45) Date of Patent: Nov. 5, 2019

(54) NICKEL-BASED CATALYST FOR LOW TEMPERATURE CO OXIDATION PREPARED USING ATOMIC LAYER DEPOSITION AND APPLICATION THEREOF

(71) Applicant: Research & Business Foundation SUNGKYUNKWAN UNIVERSITY, Suwon-si (KR)

(72) Inventors: Young Dok Kim, Suwon-si (KR); Dae Han Kim, Seoul (KR); Ju Ha Lee, Cheonan-si (KR); Myung Geun Jeong, Seoul (KR); Sang Wook Han, Seongnam-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 14/829,252

(22) Filed: Aug. 18, 2015

(65) Prior Publication Data

US 2016/0199781 A1    Jul. 14, 2016

(30) Foreign Application Priority Data

Jan. 14, 2015  (KR) ........................ 10-2015-0006970

(51) Int. Cl.
  *B01D 53/94* (2006.01)
(52) U.S. Cl.
  CPC .. *B01D 53/944* (2013.01); *B01D 2255/20753* (2013.01); *B01D 2255/30* (2013.01); *B01D 2255/50* (2013.01); *Y02A 50/2341* (2018.01)
(58) Field of Classification Search
  None
  See application file for complete search history.

(56) References Cited

U.S. PATENT DOCUMENTS

| 1,423,196 A | * | 7/1922 | Craig | ........................ B62C 5/02 |
| | | | | 278/50 |
| 2004/0110630 A1 | * | 6/2004 | Schmidt | ................ B01J 29/405 |
| | | | | 502/60 |

(Continued)

FOREIGN PATENT DOCUMENTS

| GB | 1423196 | * | 3/1973 |
| JP | 2002-273223 A | | 9/2002 |

(Continued)

OTHER PUBLICATIONS

Dell, et al. "The Absorption of Gases on Nickel Oxide". Dept of Phys and Inorganic Chemistry, the University Bristol. (1953).*

(Continued)

*Primary Examiner* — Sheng H Davis
(74) *Attorney, Agent, or Firm* — NSIP Law

(57) ABSTRACT

The present invention relates to a nickel-based catalyst for oxidizing carbon monoxide, which is prepared by forming nickel oxide on the surface of a mesoporous support by one or more cycles of atomic layer deposition, and a use thereof. The nickel-based catalyst for oxidizing carbon monoxide according to the present invention is stable at high temperatures because the size of the nickel oxide particles can be restricted to nanometer scales even at high-temperature conditions. In addition, the nickel-based catalyst exhibits catalytic reactivity for oxidation of carbon monoxide even at room temperatures. Additionally, the catalytic activity, which has been deactivated after conducting the catalytic reaction, can be regenerated through annealing and increased gradually through repeated annealing.

7 Claims, 5 Drawing Sheets

(56) References Cited

U.S. PATENT DOCUMENTS

| | | | | |
|---|---|---|---|---|
| 2007/0166220 | A1* | 7/2007 | Ceyer | B01D 53/864 |
| | | | | 423/437.2 |
| 2008/0315295 | A1* | 12/2008 | Ji | C23C 16/04 |
| | | | | 257/325 |
| 2010/0034718 | A1* | 2/2010 | Senetar | B01D 53/864 |
| | | | | 423/247 |
| 2015/0064057 | A1* | 3/2015 | Grigoropoulos | C23C 18/14 |
| | | | | 420/441 |

FOREIGN PATENT DOCUMENTS

| | | | |
|---|---|---|---|
| KR | 10-1368569 B1 | | 3/2014 |
| RU | 2505358 | * | 1/2014 |

OTHER PUBLICATIONS

Bolt, et al. "The interaction of thin NiO Layers with single crystalline alumina substrates". Surface Science, 227-240, 329 (1995).*
Bachmann, et al. "Stoichiometry of Nickel Oxide Films Prepared by ALD". Chemical Vapor Deposition. 177-180, 17 (2011).*
Utriainen, et al. "Studies of NiO thin film formation of atomic layer epitaxy". Materials Science and Engineering B 54. 98-103 (1998).*
Yolken, et al. "Thermal Regeneration of Oxide Covered Iron and Surfaces". vol. 114, No. 8 Institute for Materials Research, National Bureau of Standards. Washington DC (1967).*
Thimsen, et al. "Energy Levels, Electronic Properties, and Rectification in Ultrathin p-NiO Films Synthesized by Atomic Layer Deposition". The Journal of Physical Chemistry. 16830-16840 (2012).*
Korean Decision to Grant dated Dec. 18, 2015, in counterpart Korean Application No. 10-2015-0006970 (2 pages, in Korean).

* cited by examiner

NICKEL-BASED CATALYST FOR LOW TEMPERATURE CO OXIDATION PREPARED USING ATOMIC LAYER DEPOSITION AND APPLICATION THEREOF

CROSS-REFERENCE TO RELATED APPLICATIONS

This application claims the priority of Korean Patent Application No. 10-2015-0006970 filed on Jan. 14, 2015, in the Korean Intellectual Property Office, the disclosure of which is incorporated herein by reference.

BACKGROUND

1. Field

The present invention relates to a nickel-based catalyst for oxidizing carbon monoxide, which is prepared by forming nickel oxide on the surface of a mesoporous support by one or more cycles of atomic layer deposition, and a use thereof.

2. Description of the Related Art

Carbon monoxide, which is produced from incomplete combustion of fuels in an internal combustion engine, is very harmful to organisms including humans. As one of the representative methods for removing the exhausted carbon monoxide, the use of catalysts has been studied for a long time.

At present, as the catalysts for removing the carbon monoxide included in the exhaust gas, noble metal catalysts such as platinum, palladium, etc. are mainly used. Although they exhibit excellent catalytic activity, they are expensive and limited in that temperature should be maintained above room temperature for catalytic reactions.

Nickel oxide catalysts are drawing attention as an alternative to the noble metal catalysts because they are less expensive than the noble metal catalysts but exhibit comparable catalytic activity. However, they are problematic in that deactivation occurs quickly and research is needed to solve this problem.

According to recent studies, it has been found that the reactivity and stability of the nickel oxide catalyst can be improved if the catalyst is prepared in nanometer scales. However, when the nanosized nickel oxide catalyst is exposed to high temperatures, the particle size increases due to aggregation and the catalytic reactivity and stability of the nanosized catalyst are lost. For application of the nanosized nickel oxide catalyst, a technology for improving stability at high temperatures is necessary.

SUMMARY

The present invention is directed to providing a nickel-based catalyst for oxidizing carbon monoxide having superior activity, an apparatus for purifying an exhaust gas, a method for removing carbon monoxide, and a method for preparing a gas having carbon monoxide removed or reduced.

In a first aspect, the present invention provides a nickel-based catalyst for oxidizing carbon monoxide, which is prepared by forming nickel oxide on the surface of a mesoporous support by one or more cycles of atomic layer deposition.

In a second aspect, the present invention provides an apparatus for purifying an exhaust gas, which includes the nickel-based catalyst for oxidizing carbon monoxide according to the first aspect.

In a third aspect, the present invention provides a method for removing carbon monoxide, which comprises conducting oxidation of carbon monoxide using a nickel-based catalyst for oxidizing carbon monoxide according to the first aspect.

In a fourth aspect, the present invention provides a method for preparing a gas having carbon monoxide removed or reduced from a mixture gas comprising carbon monoxide, which comprises conducting oxidation of carbon monoxide of the mixture gas in the presence of a nickel-based catalyst according to the first aspect.

DETAILED DESCRIPTION

Hereinafter, the present invention is described in detail.

Oxidation of carbon monoxide is a very important reaction in the aspects of environment and industry. The reaction is applied in various applications, including air-purifying systems, control of environmental or industrial exhaust, control of vehicle exhaust gases, removal of carbon monoxide in PEMFCs through PROX of carbon monoxide, or the like. The overall reaction scheme is very simple as $CO + \frac{1}{2}O_2 \rightarrow CO_2$, $\Delta H_o = 283$ kJ/mol.

The inventors of the present invention have found that, when a nickel-based catalyst for oxidizing carbon monoxide is prepared by forming nickel oxide on the surface (including the surface of pores) of a mesoporous support by atomic layer deposition, a nickel-based catalyst is stable at high temperatures because the size (diameter) of nickel oxide particles can be restricted to nanometer scales even at high-temperature conditions, a nickel-based catalyst has catalytic reactivity for oxidation of carbon monoxide at room temperatures of 25° C. to 35° C., the catalytic activity is regenerated through annealing, and the catalytic activity is increased gradually through repeated annealing. The present invention is based on this finding.

A nickel-based catalyst for oxidizing carbon monoxide according to the present invention is characterized in that the nickel-based catalyst is prepared by forming nickel oxide on the surface of a mesoporous support by one or more cycles of atomic layer deposition. In particular, the nickel-based catalyst for oxidizing carbon monoxide according to the present invention can serve as a catalyst in oxidation of carbon monoxide even at room temperature.

Preferably, the nickel-based catalyst for oxidizing carbon monoxide according to the present invention may be prepared by forming the nickel oxide on the surface of the support by atomic layer deposition and then annealing the resulting nickel oxide in order to remove gases and impurities adsorbed on the surface of the catalyst.

Additionally, the nickel-based catalyst for oxidizing carbon monoxide according to the present invention may be used for oxidation of carbon monoxide, and then its catalytic activity may be regenerated through annealing. The catalytic activity of the nickel-based catalyst for oxidizing carbon monoxide according to the present invention increases gradually as the number of regeneration processes through annealing increases. Additionally, the nickel-based catalyst for oxidizing carbon monoxide according to the present invention may exhibit resistance to carbon deposition after oxidation of carbon monoxide.

The annealing for regeneration may be conducted at 100° C. to 500° C. for 1 hour to 5 hours.

In the present invention, the pore size of the mesoporous support is not limited as long as carbon monoxide can be adsorbed. However, in order to prevent the nickel oxide from aggregating to above a predetermined size by heat, which is achieved by the confinement effect of pore size of the support, the mesoporous support may have an average pore diameter of specifically 1 nm to 15 nm.

Preferably, the support may be one having high specific surface area and high-temperature stability. Non-limiting examples of the support may include alumina, silica, zeolite, a metal-organic framework or a mixture thereof.

Meanwhile, the support may have an average particle size of preferably 250 μm or greater, more preferably 250 μm to 500 μm.

Atomic layer deposition (ALD) is a technique of supplying alternatively two or more chemicals, typically called precursors required for a thin film, thereby adsorbing atomic layers on a substrate layer-by-layer.

As shown in FIG. 1, a method for preparing a nickel-based catalyst for oxidizing carbon monoxide according to the present invention may form nickel oxide on the surface of the mesoporous support by atomic layer deposition.

Since the nickel oxide may be deposited even in the pore surface of a porous material when using atomic layer deposition technique, aggregation of the nickel oxide at high temperatures may be prevented.

In the nickel-based catalyst for oxidizing carbon monoxide according to the present invention, the nickel oxide formed by atomic layer deposition may have a particle diameter of 0.5 nm to 15 nm.

As seen from FIG. 1, the atomic layer deposition, which is used to prepare the nickel-based catalyst for oxidizing carbon monoxide according to the present invention, may be conducted by the process of injection of a first precursor for supplying nickel, purging of a remaining gas, injection of a second precursor for supplying oxygen, and purging of a remaining gas. The atomic layer deposition process may be repeated layer by layer to prepare a thin film of a desired thickness. Usually, an inert gas such as nitrogen ($N_2$), argon (Ar), etc. is flown in order to purge the remaining gas.

In an exemplary embodiment, the method for preparing a nickel-based catalyst for oxidizing carbon monoxide according to the present invention may include:

a step of positioning a mesoporous support such as alumina beads in a reactor (step 1);

a step of adsorbing nickel on the surface of the mesoporous support (including pores) by injecting a nickel precursor into the reactor of the step 1 and exposing it to the mesoporous support (step 2);

a step of purging the reactor of the step 2 by injecting an inert gas (step 3); and a step of injecting an oxygen precursor into the reactor of the step 3 and exposing to the nickel adsorbed in the step 2, thereby depositing nickel oxide (step 4).

The step 1 is a preparatory step for depositing nickel oxide on a mesoporous support and is a step wherein the support is positioned in a reactor.

In order to maintain the inside of the reactor as close to a vacuum state as possible, the pressure inside the reactor in the step 1 may be maintained at 10 mtorr or lower, preferably 0.1 mtorr to 10 mtorr. When the pressure inside the reactor exceeds 10 mtorr, deposition may not occur or a uniform atomic layer may not be deposited because of the reaction between the newly injected precursor and the precursor remaining in the reactor. Additionally, impurities may be formed due to side reactions. The temperature inside the reactor in the step 1 may be preferably 200° C. to 300° C.

The step 2 is a step wherein a nickel precursor is injected into the reactor of the step 1 and exposed to the support in order to deposit nickel on the pores of the support.

In the present invention, $Ni(Cp)_2$ (cyclopentadienyl-nickel), which is easy to handle because of its solid powder form and is relatively inexpensive as compared to other nickel precursors, may be used as the nickel precursor. The nickel precursor in solid powder form is prepared into a pellet form. The solid nickel precursor may be used without blocking of valves or tubes by using the nickel precursor in pellet form.

When the nickel precursor is injected as a vapor state and deposited on the pores of the support in the step 2, if the temperature in the reactor is higher than 300° C., the amount of the nickel precursor deposited at once is too much, resulting in the similar deposition form to that of CVD (chemical vapor deposition), and thus the mesoporous structure cannot be maintained. Accordingly, the temperature of the reactor may be maintained at 200° C. to 300° C., preferably and the temperature of a gas line through which gases flow may be maintained at 100° C. to 200° C., preferably.

When the nickel precursor is injected as a vapor state in the step 2, if the vapor pressure is lower than 100 mtorr, deposition may not occur because the amount of the precursor is not enough. Additionally, if the vapor pressure exceeds 300 mtorr, the amount of the nickel precursor injected at once is too much and a long time is required to reduce the pressure of the reactor to 10 mtorr or lower in the following step. Accordingly, the vapor pressure of the nickel precursor may be maintained at 100 mtorr to 300 mtorr, preferably.

In the step 2, if the nickel precursor exposure time is shorter than 10 seconds, deposition may not occur well. Additionally, if the exposure time exceeds 60 seconds, a long time is required to reduce the pressure of the reactor to 10 mtorr or lower in the following step because the amount of the injected precursor is too much. Accordingly, the nickel precursor exposure time may be maintained at 10 seconds to 60 seconds, preferably.

The step 3 is a step wherein purging is conducted by injecting an inert gas such as nitrogen gas into the reactor of the step 2 and then pumping. By injecting the inert gas and then pumping, the inside of the reactor can be cleaned as the nickel precursor used in the step 2 is removed.

In the present invention, the term 'purging' means cleaning or removal. When the pumping is conducted after the inert gas is injected, the internal pressure may be maintained at 0.1 mtorr to 10 mtorr. If the internal pressure is higher than 10 mtorr, the inert gas remains in excess in the reactor. In this case, deposition may not occur or a uniform atomic layer may not be deposited because of the reaction between the precursors, and impurities may be formed due to side reactions.

The step 4 is a step wherein nickel oxide is formed by injecting an oxygen precursor into the reactor of the step 3 and exposing to the nickel adsorbed in the step 2.

Non-limiting examples of the oxygen precursor include $H_2O$, $H_2O_2$, an alkoxide, $O_3$, $O_2$, etc. containing an oxygen atom. Preferably, oxygen gas may be used because a gas state is favorable in terms of reaction.

When the oxygen precursor is injected in the step 4, if the vapor pressure is lower than 100 mtorr, nickel oxide may not be formed well because the amount of the precursor is not enough. Additionally, if the vapor pressure exceeds 2 torr, the amount of the oxygen precursor injected at once is too much and a long time is required to reduce the pressure of the reactor to 10 mtorr or lower in the following step. Accordingly, the vapor pressure of the oxygen precursor may be maintained between 100 mtorr and 2 torr, preferably.

In the step 4, if the oxygen precursor exposure time is shorter than 1 second, deposition may not occur well because the exposure time is too short. Additionally, if the exposure time exceeds 30 seconds, a long time is required to reduce the pressure of the reactor to 10 mtorr or lower in the following step because the amount of the oxygen precursor injected is too much. Accordingly, the oxygen precursor exposure time may be maintained at 1 second to 30 seconds, preferably.

The steps 1 to 4 according to the present invention result in a single atomic layer of the nickel oxide. Specifically, through the steps 1 to 4, nickel is adsorbed in the pores of the support as a single atomic layer by the reaction between the support and the nickel precursor, and then the nickel adsorbed in the pores of the support reacts with the oxygen precursor to form nickel oxide.

The procedure from the step 2 to the step 4 may be defined as one cycle of forming nickel oxide. The thickness of the nickel oxide thin film may be controlled by controlling the number of the cycles. Per each cycle, nickel oxide may be deposited with a thickness of about 0.02 nm.

The nickel oxide is deposited in the pores of the support without changing the physical shape of the support. Accordingly, the size of nickel oxide is restricted to nanometer scales due to the pore size of the support (e.g., mesoporous alumina beads have an average pore diameter of 12 nm), even though aggregation of the nickel oxide occurs at high temperatures.

The atomic layer deposition (ALD) used in the present invention comprises supplying precursors sequentially into a reactor and forming a thin film on the surface of a substrate such as a support through self-limiting surface reaction thereof. Accordingly, the thickness of the thin film can be controlled in atomic scales and the composition can be controlled accurately. In addition, the process of ALD can be conducted at lower temperatures as compared to the chemical vapor deposition (CVD) process and a thin and uniform film can be applied even to the surface in a complicated structure of a substrate.

The nickel-based catalyst according to the present invention may be used for oxidation of carbon monoxide.

In an experiment of the present invention, the oxidation of carbon monoxide using the nickel oxide catalyst according to the present invention was conducted and then the produced gases were analyzed by gas chromatography. Consequently, high catalytic reactivity and stability were identified and reactivity for oxidation of carbon monoxide was observed even at low room temperatures. In addition, the catalytic reactivity, which had been deactivated after conducting the catalytic reaction, was regenerated through annealing. The reactivity of the catalyst increased gradually through repeated annealing.

Meanwhile, the present invention provides an apparatus for purifying an exhaust gas, which includes the nickel-based catalyst for oxidizing carbon monoxide according to the present invention. An example of a generally used apparatus for purifying an exhaust gas is shown in FIG. 2. The exhaust gas includes a flue gas or air which needs to be purified, i.e., one from which carbon monoxide needs to be removed or reduced.

The present invention also provides a method for removing carbon monoxide, which comprises conducting oxidation of carbon monoxide using a nickel-based catalyst for oxidizing carbon monoxide according to the present invention.

Additionally, the present invention also provides a method for preparing a gas having carbon monoxide removed or reduced from a mixture gas comprising carbon monoxide, which comprises conducting oxidation of carbon monoxide of the mixture gas in the presence of a nickel-based catalyst according to the present invention.

In case of using the nickel-based catalyst for oxidizing carbon monoxide according to the present invention, oxidation of carbon monoxide can be conducted not only at high temperatures of 150° C. to 450° C. but also at low temperatures, e.g. at room temperature of 25° C. to 35° C.

The nickel-based catalyst for oxidizing carbon monoxide according to the present invention may be regenerated through annealing the nickel-based catalyst, after conducting oxidation of carbon monoxide.

Preferably, the annealing for regeneration may be conducted at 100° C. to 500° C. for 1 hour to 5 hours in the air.

The nickel-based catalyst for oxidizing carbon monoxide according to the present invention is stable at high temperatures because the size of the nickel oxide particles can be restricted to nanometer scales even at high-temperature conditions. In addition, the nickel-based catalyst exhibits catalytic reactivity for oxidation of carbon monoxide even at room temperatures. Additionally, the catalytic activity, which has been deactivated after conducting the catalytic reaction, can be regenerated through annealing and increased gradually through repeated annealing.

EXAMPLES

Hereinafter, the present invention will be described in detail through examples. However, the following examples are for illustrative purposes only and it will be apparent to those of ordinary skill in the art that the scope of the present invention is not limited by the examples.

Example 1: Preparation of Nickel Oxide Catalyst Using Atomic Layer Deposition (ALD)

A mesoporous alumina bead support was positioned in a reactor and the internal pressure of the reactor was maintained at a vacuum state of 10 mtorr or lower. The temperature inside the reactor was maintained at 250° C. and the temperature of a pipeline was maintained at 200° C.

$Ni(Cp)_2$ vapor was injected into the reactor as a first precursor and a $Ni(Cp)_2$ single atomic layer was formed on the support surface by exposing for 30 seconds under a precursor vapor partial pressure of 200 mtorr. After purging the reactor by injecting nitrogen gas, the pressure inside the reactor was maintained at a vacuum state of 10 mtorr or lower by pumping using a pump. Then, oxygen gas was injected as a second precursor and a single atomic layer of nickel oxide was supported by exposing for 30 seconds under an oxygen gas partial pressure of 1 torr so that reaction occurred with the $Ni(Cp)_2$ deposited on the mesoporous alumina surface. For the next cycle, the reactor was purged by injecting nitrogen gas and then pumping.

This procedure corresponds to one cycle. The thickness of the nickel oxide thin film supported on the support can be controlled by controlling the number of the cycles. A nickel oxide catalyst was prepared by conducting 50 cycles.

Figure 1:
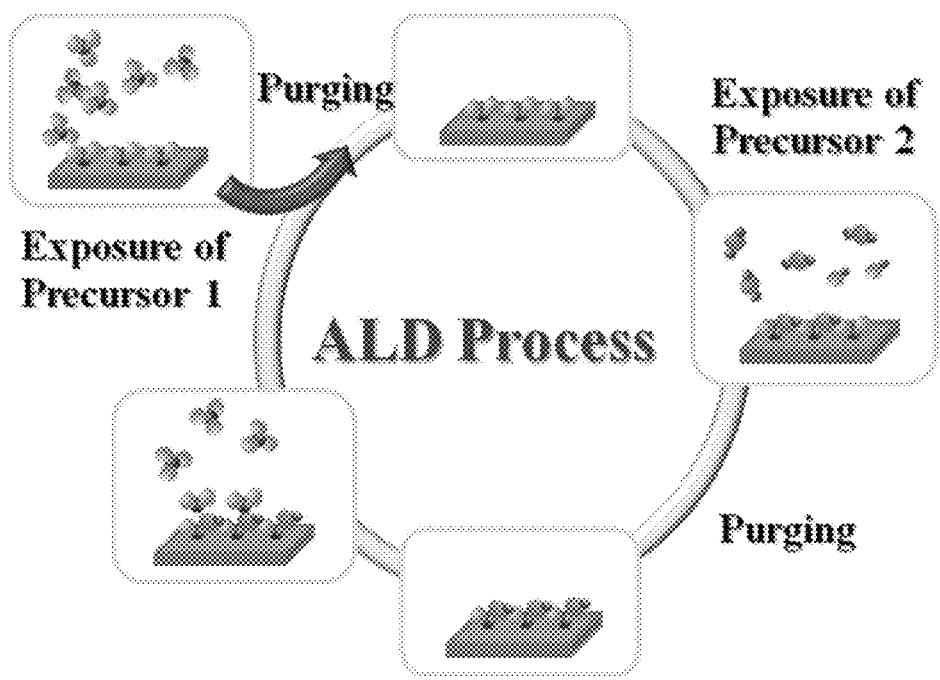
FIG. 1 schematically describes an atomic layer desorption (ALD) process.
Figure 2:
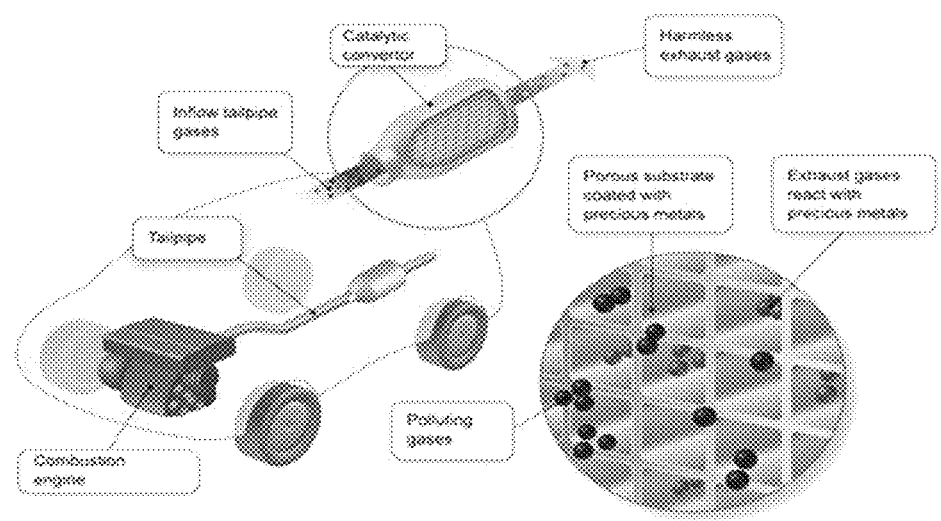
FIG. 2 shows an exemplary apparatus for purifying an exhaust gas in which a catalyst according to the present invention can be included (source: http://www.preciousmetals.umicore.com/recyclables/SAC/CatalyticConverter/).
Figure 3:
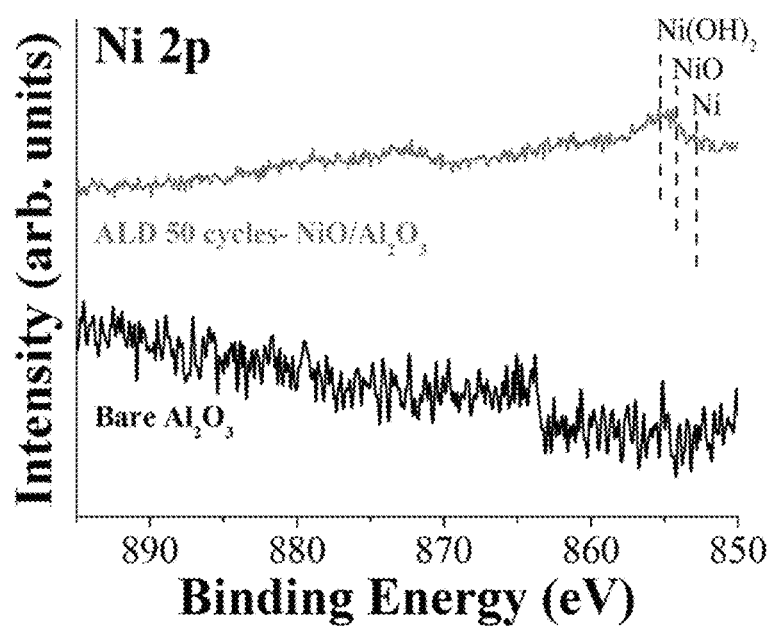
FIG. 3 shows a result of analyzing the surface of a nickel oxide catalyst prepared in Example 1 by X-ray spectroscopy.

FIG. 3 shows a result of analyzing the surface of the nickel oxide catalyst prepared in Example 1 by X-ray spectroscopy. The deposition of nickel oxide was confirmed by the newly observed Ni 2p peaks.

Experimental Example 1: Oxidation of Carbon Monoxide

The mesoporous alumina bead catalyst on which nickel oxide is supported, which was prepared in Example 1, was annealed at 300° C. for 2 hours in the air and was positioned in a reactor. Then, air containing 1% carbon monoxide was flown at a rate of 10 mL/min as a reactant gas. While maintaining the temperature of the reactor at 30° C., 150° C., and 250° C., respectively, carbon monoxide oxidation efficiency was measured by gas chromatography.

Figure 5:
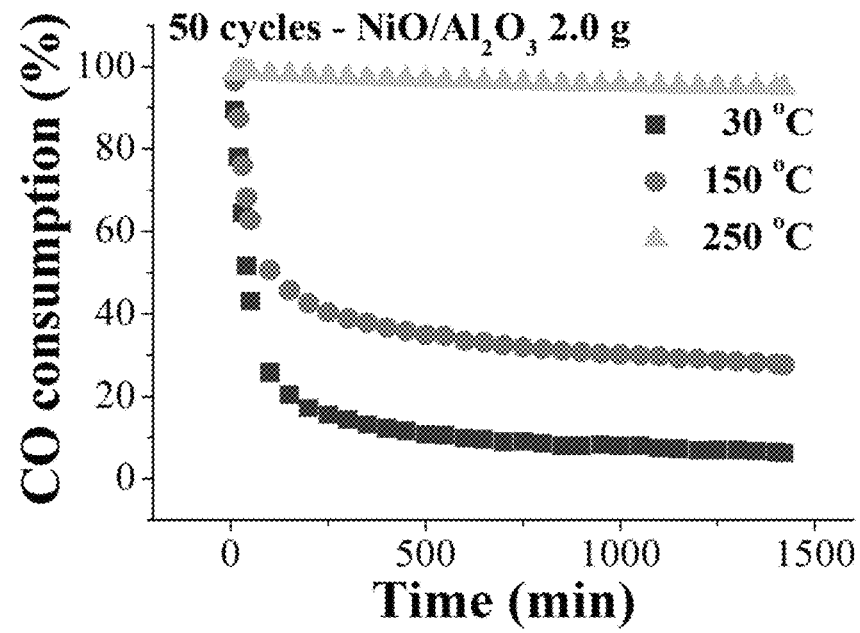
FIG. 5 shows the carbon monoxide oxidation efficiency (%) of a nickel oxide catalyst prepared in Example 1 with reaction time analyzed by gas chromatography, when used for oxidation of carbon monoxide.

FIG. 5 shows a result of measuring the volume of carbon monoxide (vol %) consumed during the catalytic reaction by gas chromatography. As seen from FIG. 5, the nickel oxide catalyst prepared in Example 1 showed high catalytic reactivity for oxidation of carbon monoxide and stability at 250° C., and also showed high catalytic reactivity, even at the initial stage of reaction at 30° C. (~90% carbon monoxide consumption).

Experimental Example 2: Oxidation of Carbon Monoxide after Repeated Annealing of Nickel Oxide Catalyst The mesoporous alumina bead catalyst on which nickel oxide is supported, which was prepared in Example 1, was positioned in a reactor. Then, air containing 1% carbon monoxide was flown at a rate of 10 ml/min as a reactant gas. While maintaining the temperature of the reactor at 30° C., reactants and products were monitored by gas chromatography. Annealing at 300° C. for 2 hours was included between 7 cycles of oxidation of carbon monoxide for 2 hours.

Figure 6:
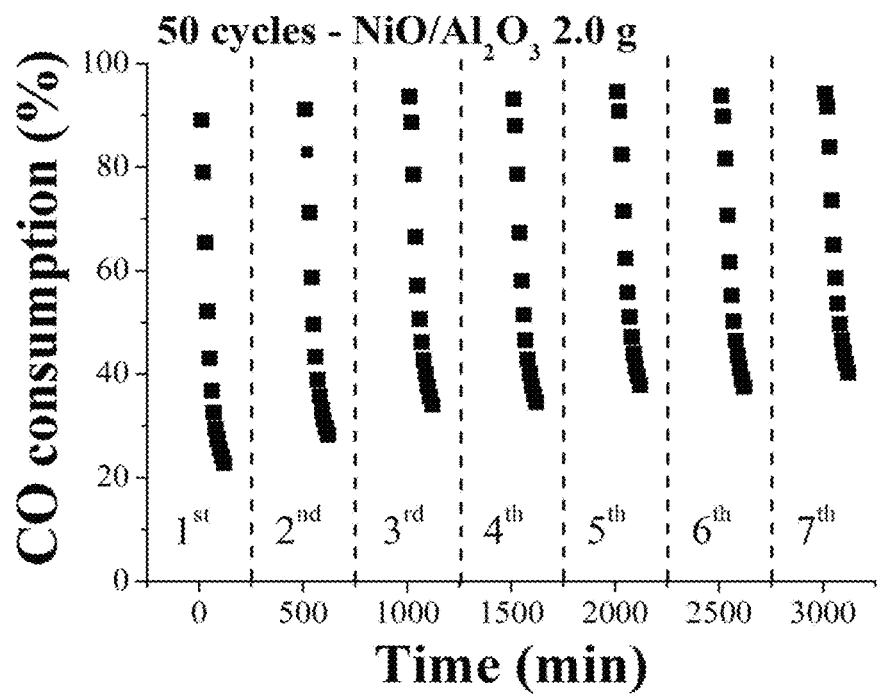
FIG. 6 shows the carbon monoxide oxidation efficiency (%) of a nickel oxide catalyst prepared in Example 1 with reaction time analyzed by gas chromatography, when used for repeated oxidation of carbon monoxide. Annealing at 300° C. for 2 hours is included between adjacent cycles.

As seen from FIG. 6, the reactivity of the nickel oxide catalyst for oxidation of carbon monoxide which had been decreased with reaction time was regenerated by annealing. In addition, the reactivity for oxidation of carbon monoxide increased gradually by repeated annealing. As the number of annealing increased, the initial reactivity of the nickel oxide catalyst for oxidation of carbon monoxide was increased.

Figure 7:
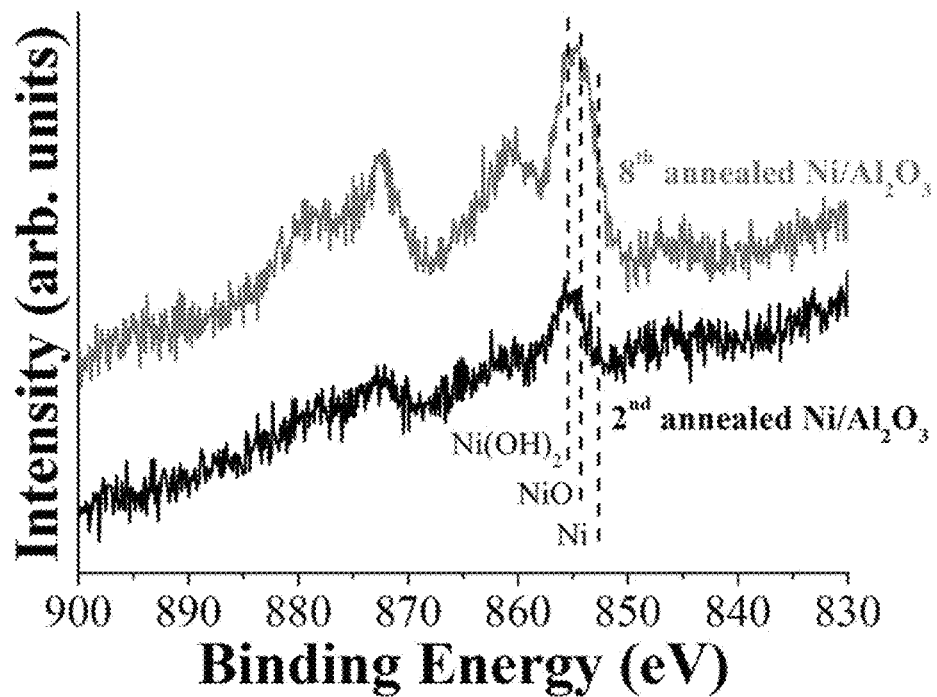
FIG. 7 and FIG. 8 show nuclear spectra of Ni and C of a 2nd annealed catalyst after a first oxidation of carbon monoxide followed by annealing at 300° C. for 2 hours, and an 8th annealed catalyst after a seventh oxidation of carbon monoxide followed by annealing at 300° C. for 2 hours analyzed by X-ray spectroscopy, when a nickel oxide catalyst prepared in Example 1 has been used for repeated oxidation of carbon monoxide.
Figure 8:
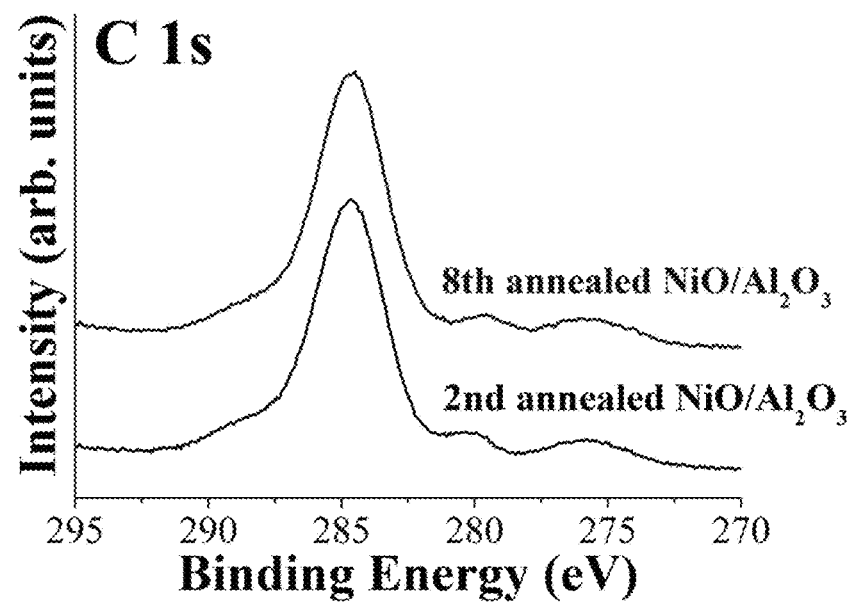

FIG. 7 and FIG. 8 show the spectra of a 2nd annealed catalyst after a first oxidation of carbon monoxide followed by annealing at 300° C. for 2 hours and an 8th annealed catalyst after a seventh oxidation of carbon monoxide followed by annealing at 300° C. for 2 hours analyzed by X-ray spectroscopy, when the nickel oxide catalyst was used for repeated oxidation of carbon monoxide. It can be seen that the intensity of the Ni 2p peaks was increased after repeated annealing, suggesting an increased proportion of nickel on the nickel oxide catalyst surface. Additionally, from the fact that the intensities of the C 1s peaks of the 2nd annealed catalyst and the 8th annealed catalyst are not significantly different, it can be seen that the carbon deposited during the oxidation of carbon monoxide was removed through the annealing (FIG. 8).

Example 2: Preparation of Nickel Oxide Catalyst Using Atomic Layer Deposition (ALD)

A nickel oxide catalyst (40-cycled $Ni/SiO_2$) was prepared in the same manner as in Example 1, except that $SiO_2$ (Aldrich) was used as a support and 40 cycles of ALD were conducted.

Figure 4:
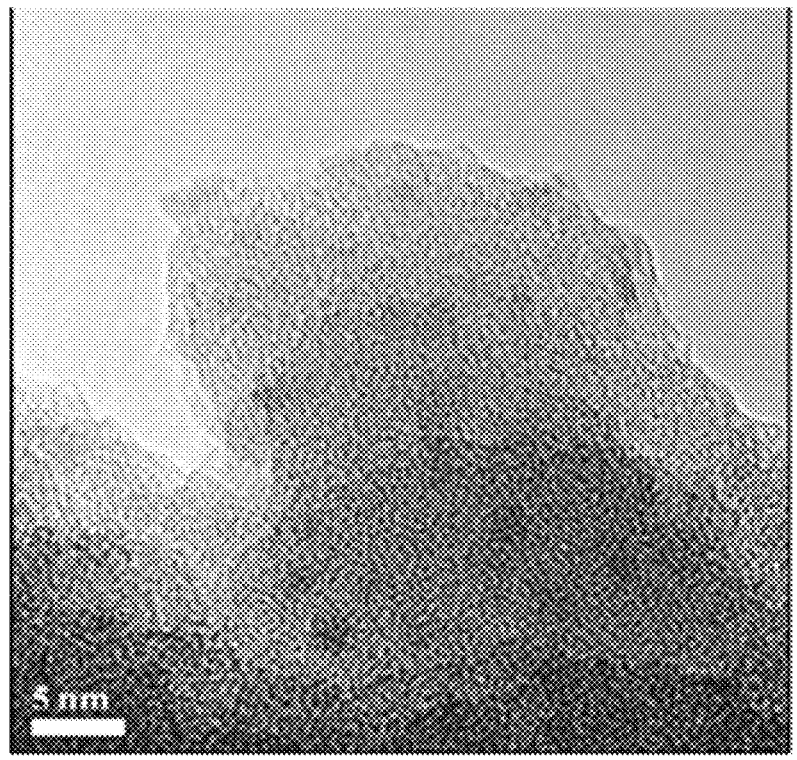
FIG. 4 shows a transmission electron microscopic image of a nickel oxide catalyst prepared in Example 2 after annealing at 450° C. for 3 hours.

FIG. 4 shows a transmission electron microscopic image of the nickel oxide catalyst prepared in Example 2 after annealing at 450° C. for 3 hours. It can be seen that the particle diameter of nickel oxide deposited on the surface of pores is about 2 nm.

Figure 9:
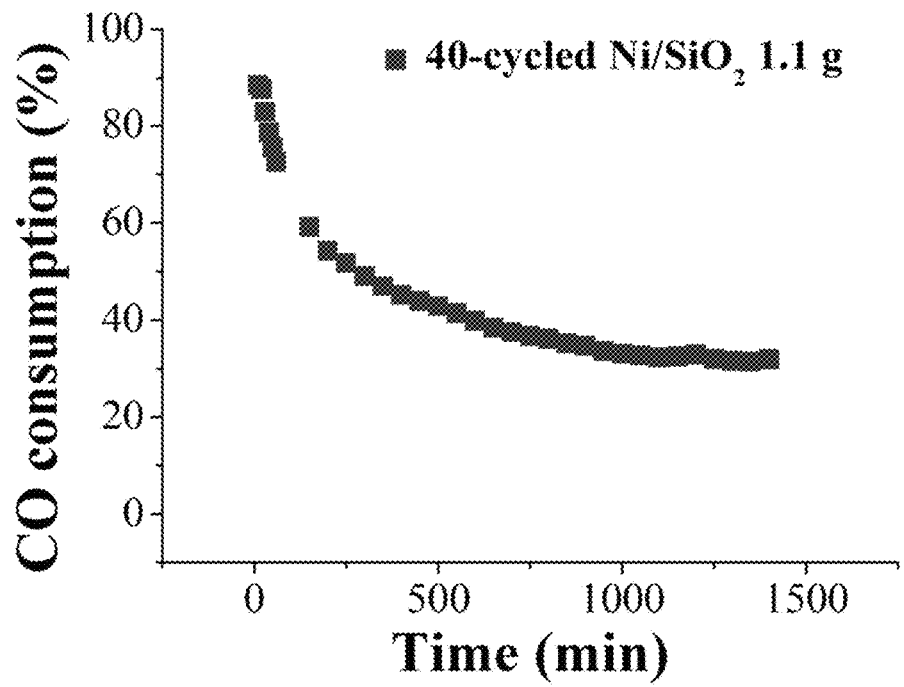
FIG. 9 shows the carbon monoxide oxidation efficiency (%) of a nickel oxide catalyst prepared in Example 2 with reaction time analyzed by gas chromatography, when used for oxidation of carbon monoxide.

Experimental Example 3: Oxidation of Carbon Monoxide 1.1 g of the porous silica catalyst on which nickel oxide is supported, which was prepared in Example 2, was annealed at 450° C. for 3 hours in the air. Then, air containing 1% carbon monoxide was flown at a rate of 10 mL/min as a reactant gas. While maintaining the temperature of the reactor at 30° C., carbon monoxide consumption (vol %) was measured by gas chromatography. The result is shown in FIG. 9.

Example 3: Preparation of Nickel Oxide Catalyst Using Atomic Layer Deposition (ALD)

A nickel oxide catalyst (5-cycled Ni/MIL-101(Cr)) was prepared in the same manner as in Example 1, except that MIL-101(Cr) was used as a support and 5 cycles of ALD was conducted under the condition described in Table 1.

TABLE 1

| | 5-cycled Ni/MIL-101(Cr) process | |
|---|---|---|
| Precursors | $Ni(Cp)_2$ at 50 mTorr | $O_2$ at 1.2 Torr |
| Precursors exposure time | 300 s + 300 s | 30 s + 270 s |
| | (Pulse + Exposure) | (Pulse + Exposure) |
| $N_2$ purging time | 30 s | |
| Pumping time | 60 s/90 s | |
| Substrate temperature | 150° C. | |
| Reactor base pressure | <20 mTorr | |

Figure 10:
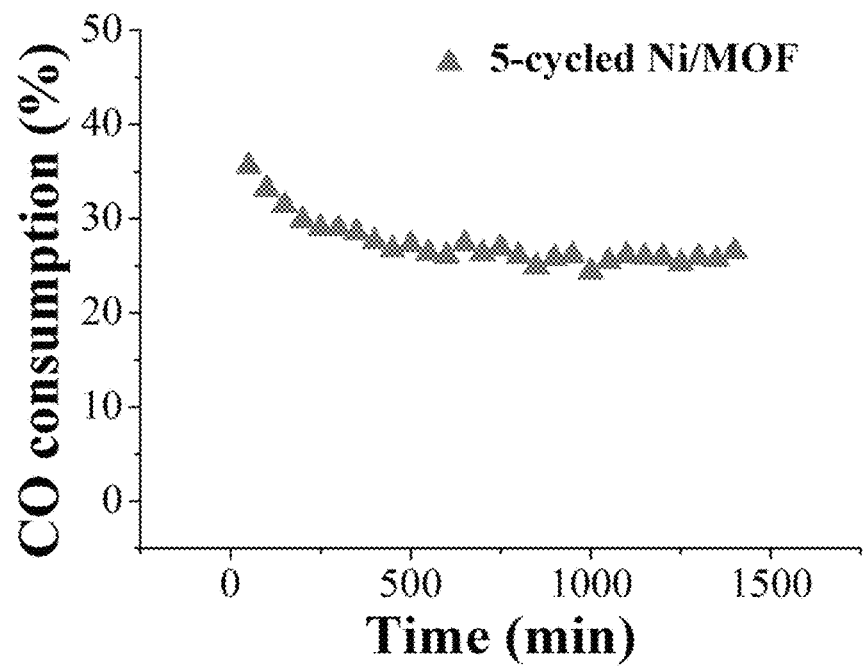
FIG. 10 shows the carbon monoxide oxidation efficiency (%) of a nickel oxide catalyst prepared in Example 3 with reaction time analyzed by gas chromatography, when used for oxidation of carbon monoxide.

Experimental Example 4: Oxidation of Carbon Monoxide 0.14 g of the MIL-101(Cr) catalyst on which nickel oxide is supported, which was prepared in Example 3, was annealed at 250° C. for 6 hours under an Ar atmosphere. Then, air containing 1% carbon monoxide and pure air were flown at a rate of 3 mL/min and 27 mL/min, respectively, as reactant gases. While maintaining the temperature of the reactor at 200° C., carbon monoxide consumption (vol %) was measured by gas chromatography. The result is shown in FIG. 10.

What is claimed is:

1. A method for removing carbon monoxide, the method comprising:
   Preparing a nickel-based catalyst for forming nickel oxide on a surface of a mesoporous support by one or more cycles of atomic layer deposition;
   conducting oxidation of carbon monoxide using a nickel-based catalyst; and
   regenerating catalytic activity of the nickel-based catalyst by annealing the nickel based catalyst at 100° to 500° for 1 hour to 5 hours between cycles of the oxidation of carbon monoxide, wherein the regenerating comprises:
   increasing the catalytic activity of the nickel-based catalyst in proportion to a number of annealing, and
   removing a carbon deposited during the oxidation of carbon monoxide through the annealing, and
   wherein the nickel-oxide formed on the surface has a particle diameter between 0.5 nm and 15 nm, and the mesoporous support has a pore diameter between 1 nm and 15 nm, to prevent aggregation of the nickel-oxide above a threshold at high temperatures and maintain stability and catalytic activity without changing the physical shape of the mesoporous support.

2. The method for removing carbon monoxide according to claim 1, wherein the oxidation of carbon monoxide is conducted at 25° C. to 450° C.

3. The method for removing carbon monoxide according to claim 1, wherein the support is alumina, silica, zeolite, or a metal-organic framework.

4. The method for removing carbon monoxide according to claim 1, wherein the annealing is conducted in air.

5. The method of claim 1, wherein the atomic layer deposition is conducted by injecting a nickel precursor onto the mesoporous support at a pressure of between 100 mtorr and 300 mtorr and for an exposure time between 10 seconds and 60 seconds.

6. A method for preparing a gas having carbon monoxide removed or reduced from a mixture gas comprising carbon monoxide, the method comprising:
   preparing a nickel-based catalyst by forming nickel oxide on a surface of a mesoporous support by one or more cycles of atomic layer deposition;
   conducting oxidation of carbon monoxide of the mixture gas in the presence of a nickel-based catalyst, and
   regenerating catalytic activity of the nickel-based catalyst by annealing the nickel-based catalyst at 100° C. to 500° C. for 1 hour to 5 hours between cycles of the oxidation of carbon monoxide, wherein the regenerating comprises:
   increasing the catalytic activity of the nickel-based catalyst in proportion to a number of annealing, and
   wherein the nickel-oxide formed on the surface has a particle diameter between 0.5 nm and 15 nm, and the mesoporous support has a pore diameter between 1 nm and 15 nm, to prevent aggregation of the nickel-oxide above a threshold at high temperatures and maintain stability and catalytic activity without changing the physical shape of the mesoporous support.

7. The method for preparing a gas having carbon monoxide removed or reduced according to claim 6, wherein the oxidation of carbon monoxide is conducted at 25° C. to 450° C.

* * * * *